United States Patent

[11] 3,627,729

| [72] | Inventor | Brian Robert Trego |
| | | Glamorgan, Wales |
| [21] | Appl. No. | 58,703 |
| [22] | Filed | July 27, 1970 |
| [45] | Patented | Dec. 14, 1971 |
| [73] | Assignee | Midland Silicones Limited |
| | | Reading, Berkshire, England |
| [32] | Priority | July 30, 1969 |
| [33] | | Great Britain |
| [31] | | 38,157/69 |

[54] CATALYZED SILICONE RESIN MOLDING COMPOSITION
12 Claims, No Drawings

| [52] | U.S. Cl. | 260/46.5 R, |
| | | 260/18 S, 260/37 SB, 260/46.5 G, 264/331 |
| [51] | Int. Cl. | C08f 11/04 |
| [50] | Field of Search | 260/46.5, |
| | | 46.5 G, 37 SB, 18 S |

[56] References Cited
UNITED STATES PATENTS

| 2,516,047 | 7/1950 | De Coste | 260/46.5 |
| 3,208,961 | 9/1965 | Kookootsedes | 260/18 |
| 3,264,260 | 8/1966 | Muller et al. | 260/46.5 |

FOREIGN PATENTS

| 899,939 | 6/1962 | Great Britain | 260/46.5 |

*Primary Examiner*—Donald E. Czaja
*Assistant Examiner*—M. I. Marquis
*Attorneys*—Robert F. Fleming, Jr., Laurence R. Hobey, Harry D. Dingman and Howard W. Hermann

ABSTRACT: A mixture of organosiloxane resin and certain catalysts has been found to be particularly useful in transfer-molding and compression-molding operations. The mixture is a siloxane resin having an organic substituent/silicon ratio of from 1/1 to 1.7/1 and at least 0.25 percent by Si bonded —OH groups, and a catalytic amount of a mixture of (a) carboxylic acid anhydride and (b) lead carbonate, lead monoxide or a mixture thereof.

CATALYZED SILICONE RESIN MOLDING COMPOSITION

This invention relates to organosiloxane molding compositions and is concerned in particular with compositions which are adapted for use in transfer and compression molding operations.

It has long been known that silicone resins can be compounded with fillers and other ingredients to provide compounds which can be molded into thermoset resin articles under the action of heat and pressure. Such compositions have, however, met with limited commercial success. One of the difficulties associated with these products has been that of providing a catalyzed composition which cures rapidly but which also has a reasonable shelf life. According to this invention, we have discovered that a particularly useful catalyst for use in the preparation of silicone resin molding compositions comprises the combination of an acid anydride with one or both of lead monoxide and lead carbonate. The use of such a catalyst combination enables the preparation of catalyzed molding compositions having good shelf stability. The catalyst combination is also capable of effecting rapid cure of silicone molding resins while permitting resin flow before gelation and is, therefore, particularly suited for use in the preparation of silicone, transfer-molding compositions. It has been proposed to cure organosilicon molding resins with a catalyst system consisting of a lead compound selected from lead monoxide and lead carbonate and a compound selected from carboxylic acids and ammonium salts of carboxylic acids. The catalyst system of the present invention, however, represents an improvement over such prior art system in that it has been found to lead to superior storage stability of the catalyzed molding composition. It is an object of this invention to introduce a new catalyst system for use with silicone resins in transfer-molding and compression-molding operations. Other objects and advantages of the invention are detailed in or will be apparent from this disclosure.

This invention provides a composition consisting essentially of (1) an organopolysiloxane resin having from 1 to 1.7 organic radicals per silicon atom and at least 0.25 percent by weight of silicon-bonded hydroxyl radicals, the organic radicals in the organopolysiloxane resin being selected from monovalent hydrocarbon radicals and monovalent halogenated hydrocarbon radicals, and (2) a catalytic amount of a catalyst comprising (a) a carboxylic acid anhydride and (b) lead carbonate and/or lead monoxide.

The invention also includes a process for preparing a molded article comprising subjecting to heat and pressure the aforesaid composition.

The organosiloxane resins which are employed in the composition of this invention are known materials and can be prepared by any of the known procedures. They can be homopolymers or they can be copolymers containing two or more different types of siloxane units or they can comprise mixtures of two or more resins. As the organic radicals bonded to silicon, there can be present any monovalent hydrocarbon or halogenohydrocarbon radicals, for example, alkyl radicals, e.g., methyl, ethyl, butyl and hexyl radicals, alkenyl radicals such as vinyl and allyl, aryl radicals such as phenyl, naphthyl, benzyl and tolyl and halogenated hydrocarbon radicals such as trifluoropropyl and chlorophenyl. Where good dielectric properties are important, the resin is preferably free of halogenated hydrocarbon substituents. For most applications, and particularly when compositions are intended for use in transfer-molding operations, it is preferred to employ organopolysiloxane resins in which the organic radicals are both phenyl and methyl radicals. Most preferred are the methylphenylsiloxane resins having a phenyl-to-silicon ratio in the range from 0.4:1 to 0.9:1 and a methyl-to-silicon ratio in the range from 0.4:1 to 1.2:1.

The organopolysiloxane resin should contain at least 0.25 percent by weight of silicon-bonded hydroxyl radicals if the desired curing properties are to be realized in the compositions. When prepared by conventional techniques, the silicon-bonded hydroxyl content of organosiloxane resins normally falls within the range from 0.5 to 5 percent by weight but in some cases may even exceed 5 percent. In addition to the specified content of silicon-bonded hydroxyl radicals, there can also be present in the resin a proportion of silicon-bonded alkoxy radicals. The presence of such alkoxy radicals is, however, optional and not essential to the successful performance of the invention.

In the catalyst (2), the lead monoxide can be employed in any of its well-known forms although the red crystalline form is preferred. The particle size of the lead compounds (b) is not critical, that occurring in any of the commercially available varieties being satisfactory. Lead compounds of small particle size, that is, less than about 25 microns, are, however, preferred because they are more readily and evenly dispersed throughout the molding compositions.

As the other component (a) of the catalyst (2), there can be used any carboxylic acid anhydride, for example, acetic anhydride, propionic anhydride, butyric anhydride, n-octoic anhydride, succinic anhydride, maleic anhydride, benzoic anhydride, phthalic anhydride and mixed anhydrides, e.g., $CH_3CO \cdot OOC \cdot C_6H_5-$. The preferred anhydrides are acetic anhydride and benzoic anhydride.

The relative proportions of the organosiloxane resin, the lead compound and acid anhydride can vary widely depending on the intended use for the molding resin and the curing properties desired therein. In general, it is preferred to use from 0.5 to 2.0 moles of the anhydride for every mole of the lead compound although a mole ratio of lead compound to anhydride as high as 1:0.1 may be more suitable for some applications. The proportion of the catalyst (2), that is, the lead compound and acid anhydride, employed relative to the organosiloxane resin is also not critical sufficient being employed to provide the desired curing properties in the composition. From 0.5 to 5 percent by weight of catalyst (2), based on the weight of the resin (1), is, however, normally sufficient.

In common with normal practice in the art of silicone molding compounds, the preferred compositions of this invention will contain an inorganic filler. Any of the numerous known fillers can be employed including, for example, quartz, fused silica, diatomaceous earths, glass, fume silica, zirconium silicate, magnesium silicate, magnesium oxide, aluminum oxide and calcium carbonate. The proportion of filler present preferably lies within the range from 200 to 350 parts by weight per 100 parts of resin. It can vary widely, however, depending on the physical properties desired in the cured resin. Although a very high loading of filler can be tolerated, it may be found difficult in some cases to disperse more than about 500 percent by weight of filler, based on the weight of resin, in the composition.

In addition to one or more fillers, the compositions of this invention can also contain other conventional ingredients, for example, pigments, preservatives, heat stability additives and release agents.

As hereinbefore stated, the compositions of this invention are particularly adapted for use in compression and transfer-molding operations, for example, in the production of silicone resin coated or encapsulated electrical equipment. They can be cured by exposure to elevated temperatures preferably in conjunction with the application of elevated pressures, temperatures of from 150 to 200° C. and pressures of from 200 to 1000 pounds per square inch being preferred in connection with the use of the compositions as transfer and compression molding materials.

The following examples, in which the parts are expressed as parts by weight, illustrate the invention.

EXAMPLE 1

100 parts of a solid phenylmethylsiloxane resin having a phenyl to silicon ratio of 0.6:1, a methyl to silicon ratio of 0.5:1 and a silicon-bonded hydroxyl content of 2.5 percent by weight, 300 parts of fused silica having a particle diameter of less than 75 $\mu$ and 1 part of calcium stearate were dry mixed for 10 minutes on a two roll mill at a temperature of about 80°

C. At the end of this period, two parts of lead carbonate and 1 part of acetic anhydride were added and the mixing continued for a further 5 minutes. When cool, the mixture was crushed to a coarse powder.

The suitability of the composition as a transfer molding material was then tested by the spiral flow test, this test involving introducing the molding powder under pressure into a split mold heated to 175° C. and containing a spiral bore of circular cross section. The radius of the bore was 0.063 inch and it was marked at one inch intervals along the interior of the spiral, (as seen with the mold split). The distance along the spiral traveled by the plastic molding composition gives a measure of its flow properties and appearance of the composition indicates its state of cure.

In the case of the composition prepared as above, the measured flow under an injection pressure of 800 p.s.i. was 18 inches and the composition cured blister-free in 3 minutes.

EXAMPLE 2

The procedure of example 1 was repeated employing a similar composition except that the lead carbonate ingredient was replaced with 1 part of lead oxide and the acetic anhydride replaced with 1 part of maleic anhydride. The other components were identical with those employed in example 1 except that the hydroxyl content of the resin was 1.5 percent.

When subjected to the spiral flow test, the measured flow of the composition was 21 inches under an injection pressure of 2500 p.s.i. and the composition cured blister-free in 7 minutes.

EXAMPLE 3

100 parts of a solid phenylmethylsiloxane resin having a phenyl-to-silicon ratio of 0.6:1, a methyl-to-silicon ratio of 0.7:1 and a hydroxyl content of 3.0 percent by weight, 200 parts of fused silica, 100 parts of 0.25 inch glass fibers and 2 parts of lithium stearate were mixed together on a two roll mill at a temperature of 80° C. for 10 minutes. One part of lead oxide and 0.5 part of benzoic anhydride were then added and the mixing continued for a further 5 minutes. The mixture was then allowed to cool and was crushed to a coarse powder.

When tested by the spiral flow test described in example 1, the measured flow of the composition under 2500 p.s.i. injection pressure was 25 inches, and the composition cured blister-free in 5 minutes.

That which is claimed is:

1. A composition consisting essentially of (1) an organopolysiloxane resin having from 1 to 1.7 organic radicals per silicon atom and at least 0.25 percent by weight of silicon-bonded hydroxyl radicals, the organic radicals in the organopolysiloxane resin being selected from monovalent hydrocarbon radicals and monovalent halogenated hydrocarbon radicals, and (2) a catalytic amount of a catalyst mixture of (a) a carboxylic acid anhydride and (b) lead carbonate, lead monoxide or a mixture thereof.

2. A composition as claimed in claim 1 wherein the organic radicals in the organopolysiloxane resin comprise both methyl and phenyl radicals.

3. A composition as claimed in claim 2 wherein the organopolysiloxane resin has from 0.4 to 0.9 phenyl radicals per silicon atom and from 0.4 to 1.2 methyl radicals per silicon atom.

4. A composition as claimed in claim 1 wherein the organopolysiloxane resin has a silicon-bonded hydroxyl content of from 0.5 to 5 percent by weight.

5. A composition as claimed in claim 1 wherein the carboxylic acid anhydride is acetic anhydride or benzoic anhydride.

6. A composition as claimed in claim 1 wherein the catalyst contains from 0.5 to 2.0 moles of the anhydride for every mole of the lead compound.

7. A composition as claimed in claim 1 which also contains an inorganic filler.

8. A silicone molding composition consisting essentially of a mixture of (1) an organosiloxane polymer containing monovalent hydrocarbon radicals as substituents bonded to silicon, the ratio of such hydrocarbon radicals to silicon being in the range from 1.0/1 to 1.7/1, and containing from 0.25 to 5.0 percent by weight silicon-bonded hydroxyl radicals and (2) 0.5 to 5 percent by weight, based on the weight of siloxane polymer (1), of a catalyst mixture of (a) a carboxylic acid anhydride and (b) lead carbonate, lead monoxide or a mixture thereof, in a ratio of from 0.5 to 2.0 mols of anhydride (a) per mol of lead compound (b).

9. The composition of claim 8 wherein the organosiloxane polymer is a methylphenylsiloxane.

10. The composition of claim 9 wherein the organosiloxane polymer contains an average of from 0.4 to 0.9 phenyl radicals per silicon atom and from 0.4 to 1.2 methyl radicals per silicon atom.

11. The composition of claim 8 wherein the carboxylic acid anhydride is acetic anhydride or benzoic anhydride.

12. The composition of claim 8 which also contains an inorganic filler.

* * * * *